United States Patent [19]
Ullrich

[11] Patent Number: 4,568,968
[45] Date of Patent: Feb. 4, 1986

[54] DIGITAL INTEGRATED CIRCUIT FOR THE COLOR MATRIX OF A COLOR-TELEVISION SET

[75] Inventor: Manfred F. Ullrich, Denzlingen, Fed. Rep. of Germany

[73] Assignee: ITT Industries, Inc., New York, N.Y.

[21] Appl. No.: 750,976

[22] Filed: Jul. 1, 1985

Related U.S. Application Data

[63] Continuation of Ser. No. 497,363, May 19, 1983, abandoned.

[30] Foreign Application Priority Data

Jul. 3, 1982 [EP] European Pat. Off. ........ 82105945.8

[51] Int. Cl.$^4$ ............................................. H04N 9/76
[52] U.S. Cl. ...................................... 358/30; 358/23
[58] Field of Search ............................ 358/30, 13, 23

[56] References Cited

U.S. PATENT DOCUMENTS

| | | | |
|---|---|---|---|
| 4,270,139 | 5/1981 | Flamm | 358/23 |
| 4,303,912 | 12/1981 | Stafford et al. | 358/13 |
| 4,355,327 | 10/1982 | Nagumo et al. | 358/13 |
| 4,503,454 | 3/1985 | Lewis, Jr. | 358/30 |

Primary Examiner—Michael A. Masinick
Attorney, Agent, or Firm—Donald J. Lenkszus

[57] ABSTRACT

The circuit contains three multipliers/adders for the luminance signal (y) and the two color-difference signals (r−y, b−y). For the output signals of these stages, four parallel adders are provided. The multipliers for the factors −0.51 and −0.19, which would be required in accordance with the color-television-system formula y=0.3r+0.59g+0.11b are rendered unnecessary because, among other things, the input signals are provided with correction factors (k, L, m) and correction addends (d, e, f) in the multipliers/adders in view of a presettable color overload.

14 Claims, 1 Drawing Figure

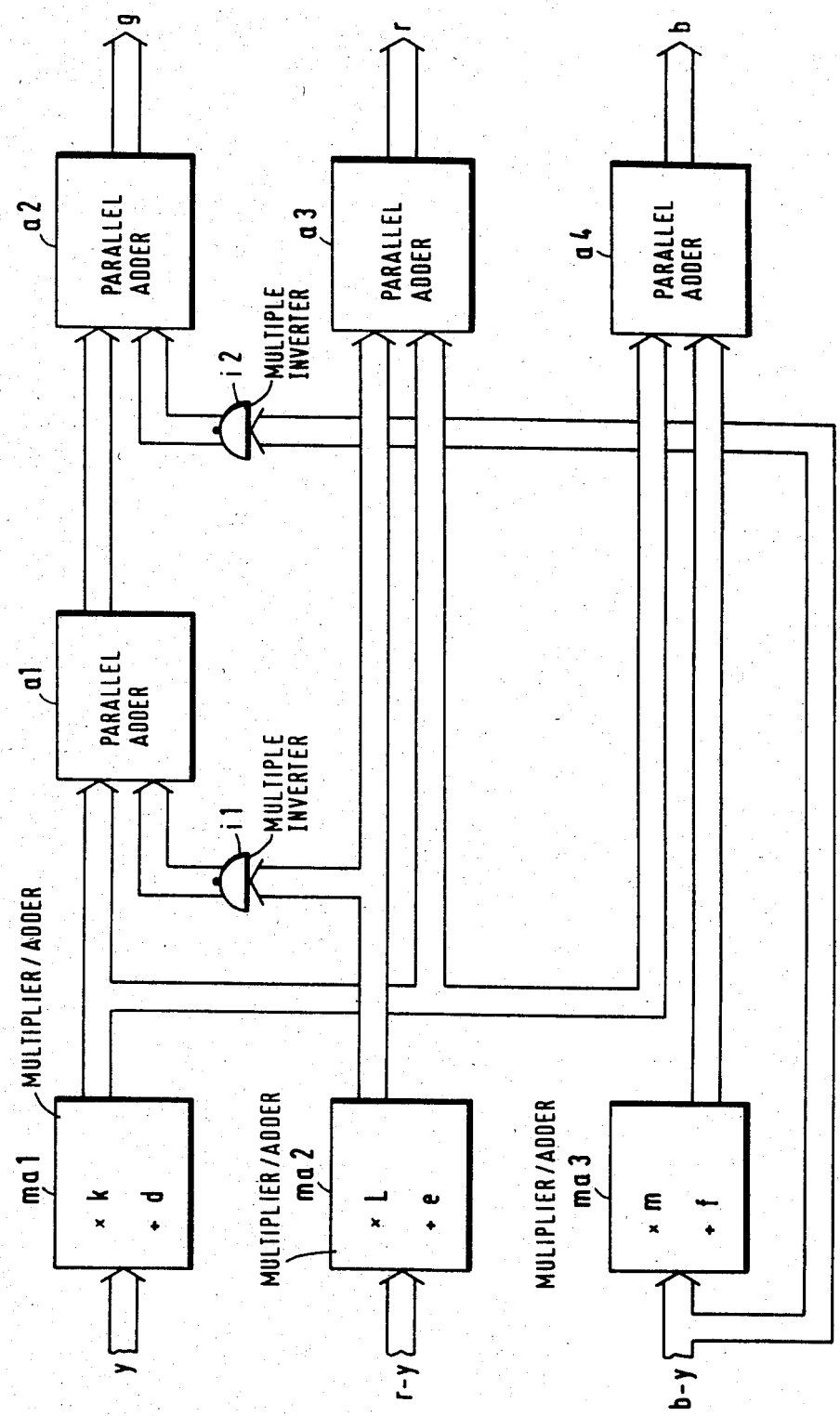

DIGITAL INTEGRATED CIRCUIT FOR THE COLOR MATRIX OF A COLOR-TELEVISION SET

This application is a continuation of application Ser. No. 497,363, filed May 19, 1983, now abandoned.

BACKGROUND OF THE INVENTION

1. Field of the Invention

The present invention relates to a digital integrated circuit for the color matrix of a color-television set with digital signal processing circuitry wherein the digital luminance signal and the two digital color-difference signals are applied to the three parallel inputs of the color matrix, whose three parallel outputs provide the digital color signals.

2. Description of the Prior Art

In present-day color-television systems (NTSC, PAL, SECAM), the luminance signal Y is composed of the three color signals R=red, G=green, and B=blue according to the following equation:

$$Y = 0.3R + 0.59G + 0.11B.$$

The color-television transmitter transmits the two color-difference signals R−Y and B−Y together with further signals using different modulation methods depending on the color-television system. After demodulation and separation, the color signals are regained by the color matrix in the color-television receiver according to the following equations:

$$R = (R-Y) + Y$$

$$G = -0.5(R-Y) - 0.19(B-Y) + Y$$

$$B = (B-Y) + Y$$

For the color matrix commonly used in color-television sets, circuits consisting of suitable resistor networks are generally used which convert the analog color-difference signals into corresponding analog color signals.

In color-television sets with digital signal processing circuitry, as are disclosed, for example, in Offenlegungsschrift DE No. 28 54 236 A1 corresponding to U.S. Pat. No. 4,270,139, the color-difference signals and the luminance signal are present in digital form, and in such sets, too, a digital color matrix must satisfy the above three equations for the digital color signals. By means of parallel adders and parallel multipliers, the idealized digital color matrix can be readily implemented on the basis of these equations.

However, the use of such a color matrix would be greatly limited because such a matrix would not take into account the decimal reduction factor 0.88 for the red-minus-luminance signal and the decimal reduction factor 0.49 for the blue-minus-luminance signal and, in addition, would leave the manufacturer no choice in determining the color overload.

SUMMARY OF THE INVENTION

The object of the invention is to provide a digital color matrix which both takes into account the aforementioned reduction factors and permits a color overload up to a factor of 2. Furthermore, the design of the color matrix is to be such that the output signals of the matrix, i.e., the three digital color signals, are zero when the two digital color-difference signals and the digital luminance signal at the input of the matrix are zero. Finally, the maximum color overload intended by the manufacturer is to be possible at a predetermined number of digits of the digital color signals and a predetermined number of digits of the two digital color-difference signals and the digital luminance signal.

The solution of the various aspects of the problem offers the advantage that the multipliers required for the abovementioned factors of −0.51 and −0.19 can be dispensed with, and that only the three multipliers required to take into account the color overload and, of course, the four adders also required in the ideal color matrix are needed.

DESCRIPTION OF THE DRAWING

The drawing is a highly schematic diagram of an embodiment of the invention.

DESCRIPTION OF THE INVENTION

The digital luminance signal y and the two color-difference signals r−y and b−y are generated by suitable stages of the digital color-television receiver. Such stages are described in the above-mentioned Offenlegungsschrift DE No. 28 54 236 A1 and will, therefore, be assumed to be known within the scope of the present invention. In the embodiment shown in the FIGURE, the digital luminance signal y is applied to the parallel input of the first multiplier/adder ma1, which adds the first addend d to the product of the luminance signal y and the first factor k. Similarly, the red-minus-luminance difference signal r−y is applied to the parallel input of the second multiplier/adder ma2, which adds the second addend e to the product of this color-difference signal and the second factor L. The blue-minus-liminance difference signal b−y is applied to the parallel input of the third multiplier/adder ma3, which adds the third addend f to the product of the b−y signal and the third factor m. The three factors k, L, m and the three addends d, e, f are determined by the following relationship in decimal notation; the numerical values in decimal notation are thus processed by the three multipliers/adders ma1, ma2, ma3 in the number system used in the concrete circuit; in the simplest case, the number system is the binary system. Thus, the following six equations hold:

$$k = 1/(0.89s + 0.11) \qquad (1)$$

$$L = 1.4sk \qquad (2)$$

$$m = 2.514sk \qquad (3)$$

$$d = 1 - 5/6 \qquad (4)$$

$$e = 5/6 - 0.7sk \qquad (5)$$

$$f = 11/6 - 1.257sk \qquad (6)$$

where s is the maximum color overload set at the factory.

The parallel output of the first multiplier/adder ma1 is connected to the first parallel input of the first parallel adder a1, to whose second parallel input the output signal from the second multiplier/adder ma2 is applied after being inverted digit by digit and shifted one position to the right. The digit-by-digit inversion is advantageously accomplished by means of one inverter per digit, which is illustrated in the figure by the first multiple inverter i1.

The parallel output of the first parallel adder a1 is connected to the first parallel input of the second parallel adder a2, to whose second parallel input the blue-minus-luminance difference signal b−y is applied after being inverted digit by digit and shifted one position to the right. This inversion is advantageously accomplished by means of the multiple inverter i2.

The parallel output of the first multiplier/adder ma1 is also coupled to the first parallel input of the third parallel adder a3, which has its second parallel input connected to the parallel output of the second multiplier/adder ma2. Also coupled to the parallel output of the first multiplier/adder ma1 is the first parallel input of the fourth parallel adder a4, which has its second parallel input connected to the parallel output of the third multiplier/adder ma3.

The parallel outputs of the second parallel adder a2, the third parallel adder a3, and the fourth parallel adder a4 provide the green signal g, the red signal r, and the blue signal b, respectively, these three signals being the digital color signals, as mentioned previously.

As was also mentioned above, the digital color matrix according to the invention, contrary to expectation, contains no multipliers for the decimal factors −0.51 and −0.19, by which the r−y and b−y signals would have to be multiplied. This advantageous feature is obtained by taking the steps explained in the following, which led to the solution of the problem in accordance with the invention.

As considerations of the inventor show, it is advantageous to assign the maximum numerical value of the blue signal to the maximum output control range of the digital color matrix. For example, if the digital color signals are eight-digit signals, and the individual stages use the binary system, the eight-digit binary number 11111111 at the output of the fourth parallel adder a4 will be assigned to the full output control range, which means that the preset maximum color overload occurs at this numerical value. For an overload value of s=1, i.e., full saturation, the maximum value of the blue signal must be correspondingly reduced; a corresponding measure is the first factor k. From $$b-y = 0.3r + 0.58g + 0.11b$$

it follows for r=g=0 that the maximum value $(b-y)_m = 0.89$. On the other hand, it follows from the condition r=g=0 that the maximum value $y_{bm}$, which is a pure blue value in this case, is 0.11. The defining equation for the first factor k can thus be written as $$(y_{bm} + (b-y)_m s) k = 1,$$

and rearranging terms gives $$k = 1/(0.89s + 0.11) \qquad (1)$$

As is well-known the color-difference signals are transmitted with different reduction factors, namely the red-minus-luminance signal with the reduction factor 0.88, and the blue-minus-luminance signal with the reduction factor 0.49. In addition to these factors, the color overload desired by the manufacturer must also be taken into account at the input end of the color matrix. Because of the lesser reduction of the red-minus-luminance signal r−y (factor 0.88), this signal is the determining signal. The possible range of values, i.e., the peak-to-peak value of the red-minus-luminance signal, so to speak, follows from a consideration of the following two cases: presence of pure red and presence of red=0. For pure red, g=b=0, so that $(r-y)_m = +0.7r$. The minimum value $(r-y)_0$ follows from the condition g=b=1, r=0 to −0.7. The red-minus-luminance signal thus lies in the range ±0.7, i.e., has the width 1.4, which, multiplied by reduction factor 0.88, is applied to the input of the color matrix.

The digital maximum value of the input signal of the color matrix must thus correspond to 1.4·0.88s.

Similar considerations for the blue-minus-luminance signal show that the maximum range of this signal is ±0.89·0.49. Thus, the maximum range to be processed in the case of the red-minus-luminance signal is greater than that in the case of the blue-minus-luminance signal, and the circuit of the color matrix must be so designed that the input-signal range satisfies the condition ±0.7·0.88.

As was just shown, a positive numerical value is obtained for the maximum of the red-minus-luminance signal, and a negative numerical value for the minimum. This must be taken into account in the matrix by allowing for the midranges of the two color-difference signals at the input end with the additional decimal numerical value ±0.5.

According to the inventor's above consideration, the second factor L and the third factor m are thus defined by $$L = \frac{1.4s}{0.89s + 0.11} = 1.4sk \qquad (2)$$

$$m = \frac{1.4 \cdot 0.88ks}{0.49} = 2.514sk \qquad (3)$$

The following table gives the numerical values for k, L, m, and s=1, 1.5, 2:

TABLE 1

| s | 1.0 | 1.5 | 2.0 |
|---|---|---|---|
| k | 1 | 0.692 | 0.5291 |
| L | 1.4 | 1.453 | 1.481 |
| m | 2.513 | 2.61 | 2.661 |

It can be seen that the values of L and m vary only little between s=1 and s=2, so that it is advantageous to design the entire color matrix for a fixed average value of s=1.5.

It is also apparent that the factor m, by which the b−y signal is multiplied, and the factor −0.19 of the ideal matrix give approximately the common factor −0.5, which is satisfied particularly for s=1.5 to a very good approximation (the exact value is s=1.687). This leads to one essential feature of the invention, namely that a multiplier for the factor −0.89 can be dispensed with.

The considerations for determining the three addends d, e, f start from the fact that it is advantageous and advisable to make the output signals of the color matrix zero if the input signals y, r−y, and b−y disappear. Taking into account the additive value +0.5 necessary for the two color-difference signals r−y and b−y (see above), the following set of equations is thus obtained for determining the three addends d, e, f:

$$d + (0.5 \cdot L + e) \cdot (-0.5) + 1 + 0.5(-0.5) + 0.5 = g = 0$$
$$d + 0.5 \cdot L + e = r = 0$$
$$d + 0.5m + f = b = 0$$

Solving this set of equations for d, e, and f gives $d = -5/6$ $e = 5/6 - 0.7sk$ and $f = 11/6 - 1.257sk$. The calculation of the numerical values in the range $s=1$ to $s=2$ shows that e, like d, becomes negative, so that two parallel subtractors would be necessary. However, this can be avoided in a simple manner in view of the fact that these negative numbers become positive numbers by addition of 1. The only result is that the color signals g and r are greater by decimal 1, while the color signal b is greater by decimal 2. However, since the number of digits of the output signals of the color matrix is too small to represent these additional additive quantities, i.e., the output signal of the color matrix would have to have one or two additional digits, respectively, which is not the case, the additive quantities have no effect in the output signal.

According to a further feature of the invention, the multiplier required for the factor $-0.51$ of the ideal matrix is not necessary, either, because the factor 0.51 is replaced by the factor $0.5 = 2^{-1}$. In the binary system, multiplication by powers of two is easily achieved by correspondingly shifting the digits of the signal to the left or to the right with respect to the digits to which it is to be applied. The minus operator is implemented by inverting the individual digits, so that the arrangement shown in the FIGURE is obtained.

If the three adders a2, a3, a4 have suitable capacities, the digits resulting from the above-mentioned additive 1 can be used to advantage for monitoring the color matrix. If the input signals of the color matrix do not lie within the predetermined or permissible ranges, signals indicating that the output signals have exceeded or fallen below the permissible range can occur in these additional positions, which lie above the actual most significant digit of the output signals. These signals can be used to activate digital limiters which clamp the respective output signal of the color matrix to the maximum value when it has exceeded the permissible range, and to the minimum value when it has fallen below this range. The following table shows the assignment of the signals in these additional positions for the respective operating conditions:

TABLE 2

| | Two digits above the most significant digit | | |
|---|---|---|---|
| | in the permissible range | above the permissible range | below the permissible range |
| r:a3 | 01 | 10 | 00 |
| g:a2 | 01 | 10 | 00 |
| b:a4 | 10 | 11 | 01 |

The three multipliers/adders ma1, ma2, ma3 are preferably implemented with read-only memories (ROMs) or reprogrammable read-only memories (e.g., EAROMs).

The digital color matrix according to the invention is preferably implemented using insulated-gate field-effect transistor integrated circuitry, which is ideally suited for implementing digital circuits.

I claim:

1. Digital integrated circuit providing a color matrix for a color-television set with digital signal processing circuitry wherein the digital luminance signal (y) and the two digital color-difference signals (r−y, b−y) are applied to the color matrix and the color matrix provides the digital color signals (g, r, b), said circuit comprising:

a first multiplier/adder (ma1), having a parallel input for receiving the digital luminance signal (y), for adding a first addend (d) to the product of the digital luminance signal (y) and a first factor (k);

a second multiplier/adder (ma2), having a parallel input for receiving the red-minus-luminance signal (r−y), for adding a second addend (e) to the product of the red-minus-luminance signal (r−y) and a second factor (L);

a third multiplier/adder (ma3), having a parallel input for receiving the blue-minus-luminance signal (b−y), for adding a third addend (f) to the product of the blue-minus-luminance signal (b−y) and a third factor (m), the three factors (k, L, m) and the three addends (d, e, f) being determined by the following relationships in decimal notation, $$k = 1/(0.89s + 0/11) \tag{1}$$

$$L = 1.4sk \tag{2}$$

$$m = 2.514\,sk \tag{3}$$

$$d = 1 - 5/6 \tag{4}$$

$$e = 5/6 - 0.7sk \tag{5}$$

$$f = 11/6 - 1.257\,sk \tag{6}$$

where s is the maximum color overload set at the factory;

a first parallel adder (a1) having a first parallel input connected to a parallel output of the first multiplier/adder (ma1), and a second parallel input to which is applied an output signal of the second multiplier/adder (ma2) after it is inverted digit by digit and shifted one position to the right;

a second parallel adder (a2) having a first parallel input connected to the parallel output of the first parallel adder (a1), and a second parallel input to which is applied the blue-minus-luminance signal (b−y) after it is inverted digit by digit and shifted one position to the right:

a third parallel adder (a3) having first and second inputs connected to the output of the first multiplier/adder (ma1) and to the output of the second multiplier/adder (ma2), respectively; and a fourth parallel adder (a4) having first and second parallel inputs connected to the first multiplier/adder (ma1) and to the output of the third multiplier/adder (ma3), each of said second, third and fourth parallel adders having a parallel output, whereby the parallel outputs of the second, third, and fourth parallel adders (a2, a3, a4) are the outputs for the digital green, red, and blue signals (g, r, b), respectively.

2. A digital integrated circuit as claimed in claim 1, wherein the multiplier/adder devices (ma1, ma2, ma3) comprise read-only memories.

3. A digital integrated circuit as claimed in claim 1, wherein the multiplier/adder devices (ma1, ma2, ma3) comprise reprogrammable read-only memories.

4. A digital color matrix comprising:

first means for adding a first terminal quantity to the product of a digital luminance signal and a first factor;

second means for adding a second predetermined quantity to the product of a first color difference signal and a second factor;

third means for adding a third determined quantity to the product of a second color difference signal and a third factor;

fourth means for adding the sum output of said first means to the sum output of said second means inverted digit by digit and shifted one position;

fifth means for adding the sum output of said first means to said second color difference signal inverted digit by digit and shifted one position sixth means for adding the sum outputs of said first and second means; and seventh means for adding the sum outputs of said first and third means;

wherein the outputs of said fifth, sixth and seventh means are digital color signals.

5. A digital color matrix in accordance with claim 4 wherein:

said first predetermined factor k is equal to $1/(0.89S+0.11)$;

said second predetermined factor L is equal to 1.4 sk;

said third predetermined factor m is equal to 2.514 sk; and

S is the maximum color overload.

6. A digital color matrix in accordance with claim 5 wherein:

said first predetermined quantity is equal to 1–5/6;

said second predetermined quantity is equal to 5/6–0.7 sk; and said third predetermined quantity is equal to 11/6–1.257sk.

7. A digital color matrix in accordance with claim 4 wherein:

said first color difference signal is a red-minus-luminance signal and said second color difference signal is a blue-luminance-signal.

8. A digital color matrix in accordance with claim 4 wherein:

said first, second and third predetermined factors each has a predetermined relationship to the maximum color overload.

9. A digital color matrix comprising:

a first multiplier/adder for adding a first addend to the product of a digital luminance signal and a first factor;

a second multiplier/adder for adding a second addend to the product of a digital red-minus-luminance signal and a second factor;

a third multiplier/adder for adding a third addend to the product of a digital blue-minus-luminance signal and a third factor;

a first adder for adding the output of said first multiplier/adder and the output of said second multiplier/adder inverted digit-by-digit and shifted one position;

a second adder for adding the output of said first multiplier/adder and said blue-minus-luminance signal after it is inverted digit-by-digit and shifted one position;

a third adder for adding the outputs of said first and second multiplier adder; and a fourth adder for adding the outputs of said first and third multiplier/adder;

the outputs of said second, third, and fourth parallel adders providing digital green, red, and blue signals respectively.

10. A digital color matrix in accordance with claim 9 wherein:

said first second and third factors each has a predetermined relationship to the maximum color overload.

11. A digital color matrix in accordance with claim 10 wherein:

$k = 1/(0.895S + 0.11)$;

$L = 1.4 \text{ sk; and}$ $m = 2.514 \text{ sk}$ where k is said first factor, L is said second factor, m is said third factor and S is a maximum color overload.

12. A digital color matrix in accordance with claim 9 wherein:

each of said first, second, and third multiplier/adders and each of said first, second, third and fourth adders has parallel inputs and outputs.

13. A digital color matrix in accordance with claim 9, wherein each of said first, second and third multiplier adders comprise a read only memory.

14. A digital color matrix in accordance with claim 9 wherein each of said first, second, third and fourth multiplier/adders comprises a reprogrammable read only memory.

* * * * *